United States Patent

Adams

[11] Patent Number: 5,320,657
[45] Date of Patent: Jun. 14, 1994

[54] STAGGERED SHORT PLEAT AIR FILTER

[75] Inventor: Michael D. Adams, Bessemer City, N.C.

[73] Assignee: Dana Corporation, Toledo, Ohio

[21] Appl. No.: 56,117

[22] Filed: Apr. 30, 1993

[51] Int. Cl.⁵ ............................................. B01D 29/21
[52] U.S. Cl. ....................................... 55/463; 55/498; 55/502; 55/521; 210/493.1
[58] Field of Search ................ 55/497, 498, 521, 462, 55/463, 502, 527; 210/493.1–493.5, 497.3

[56] References Cited

U.S. PATENT DOCUMENTS

| | | |
|---|---|---|
| 1,303,438 | 5/1919 | Wiehl et al. ............... 210/493.5 |
| 2,269,461 | 1/1942 | Lehmberg . |
| 2,627,350 | 2/1953 | Wicks . |
| 3,022,861 | 2/1962 | Harms ...................... 55/521 X |
| 3,266,223 | 8/1966 | Dresser et al. ............ 55/521 X |
| 3,467,256 | 9/1969 | Humbert, Jr. et al. ...... 210/493.1 X |
| 3,662,893 | 5/1972 | Humbert, Jr. ............. 210/315 |
| 3,799,354 | 3/1974 | Buckman et al. ........... 210/493 |
| 4,552,657 | 11/1985 | Ogawa ..................... 210/493.1 X |
| 5,106,397 | 4/1992 | Jaroszczyk et al. ........ 55/270 |
| 5,125,940 | 6/1992 | Stanhope et al. ........... 55/498 X |

FOREIGN PATENT DOCUMENTS

| | | | |
|---|---|---|---|
| 199498 | 9/1958 | Austria .................... 55/521 |
| 1955789 | 10/1969 | Fed. Rep. of Germany ... 210/493.1 |
| 3935503 | 5/1991 | Fed. Rep. of Germany ... 210/493.5 |
| 58-093954 | 6/1983 | Japan ....................... 55/498 |
| 60-061017 | 4/1985 | Japan ....................... 210/493.5 |
| 60-238111 | 11/1985 | Japan ....................... 210/493.1 |
| 725066 | 3/1955 | United Kingdom ........... 210/493.1 |
| 1195634 | 6/1970 | United Kingdom ........... 210/493.1 |
| 2030464 | 4/1980 | United Kingdom ........... 210/493.2 |

*Primary Examiner*—Robert Spitzer
*Attorney, Agent, or Firm*—MacMillan, Sobanski & Todd

[57] ABSTRACT

A high velocity air filter includes a hollow, generally cylindrical filter element comprised of a filtering material folded to extend back and forth between inner and outer peripheral surfaces to define a series of pleats extending longitudinally of the filter element. The inner edge of a plurality of the pleats is a lesser distance from the longitudinal axis of the filter element than the inner edge of the other pleats, thereby forming a plurality of short pleats and a plurality of long pleats. The inner diameter of the filter element is less crowded than in conventional high velocity air filters. The restriction to airflow is thus lowered without increasing the surface area of the filter media or sacrificing the capacity of the filter element.

21 Claims, 2 Drawing Sheets

STAGGERED SHORT PLEAT AIR FILTER

BACKGROUND OF THE INVENTION

1. Field of the Invention

The invention relates to air filters and, more particularly, to an improved pleated filter media for high velocity air filters.

2. Summary of Related Art

Air filters are well known devices wherein air is drawn or forced into a housing and caused to pass through a filter unit having a full flow, pleated filter media to remove the dirt, dust particles and other contaminants carried in the air. Substantially clean air is thereby passed to the point of usage, such as an internal combustion engine.

Such air filters generally comprise a filter housing provided with an air inlet and an air outlet. A filter element is mounted within the housing and is interposed between the inlet and outlet of the housing. A seal is positioned to seal the inlet from the outlet so that no air can pass out of the outlet without having first passed through the filter element. The filter element is conventionally constructed of a pleated paper type filtering material folded in a manner to define a series of circumferentially arranged and axially extending pleats. The filter element is generally cylindrically-shaped, and may be frustoconically-shaped.

High velocity air filters have heretofore included pleated paper filter elements in which the length of all of the pleats is the same; that is, the distance from the radially outer edge of a pleat to the radially inner edge of a pleat is substantially the same for all of the pleats. However, in applications requiring relatively compact air filters, the inner diameter of the filter element is reduced to the point that the inner, or downstream, edges of the pleats tend to become unduly crowded. This causes increased restriction of air flow through the filter element, resulting in a loss of engine power.

Filter elements for relatively low velocity oil filters have been provided with long pleats alternating with much shorter pleats, often referred to as a "W" or "M" pleat configuration, for many years. The purpose of the "W" or "M" pleat configuration in oil filters is to increase the total surface area of the filter media employed in the oil filter element. A staggered short pleat configuration has heretofore never been utilized in a filter element for a high velocity air filter application, nor would the "W" or "M" pleat configuration as used in oil filters be suitable in a high velocity air filter. In addition, with the "W" or "M" pleat configuration as used in oil filters, independent spacer formations are generally required to evenly space each pleat from the adjacent pleats.

SUMMARY OF THE INVENTION

The present invention relates to a high velocity air filter comprising a hollow, generally cylindrical filter element formed of a filtering material folded to extend back and forth between inner and outer peripheral surfaces to define a series of pleats extending longitudinally of the filter element. Each of the pleats has an outer longitudinally extending edge and an inner longitudinally extending edge. The inner edge of a plurality of the pleats is a lesser distance from the longitudinal axis of the filter element than the inner edge of the other pleats, thereby forming a plurality of short pleats and a plurality of long pleats.

The novel construction of the present invention is advantageous in that the inner diameter of the filter element is less crowded than with conventional, high velocity air filter elements. This reduces the restriction to airflow without significantly decreasing the surface area of the filter media or sacrificing the capacity of the filter element. Furthermore, separate spacer formations are not required to space each pleat from the adjoining pleats.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
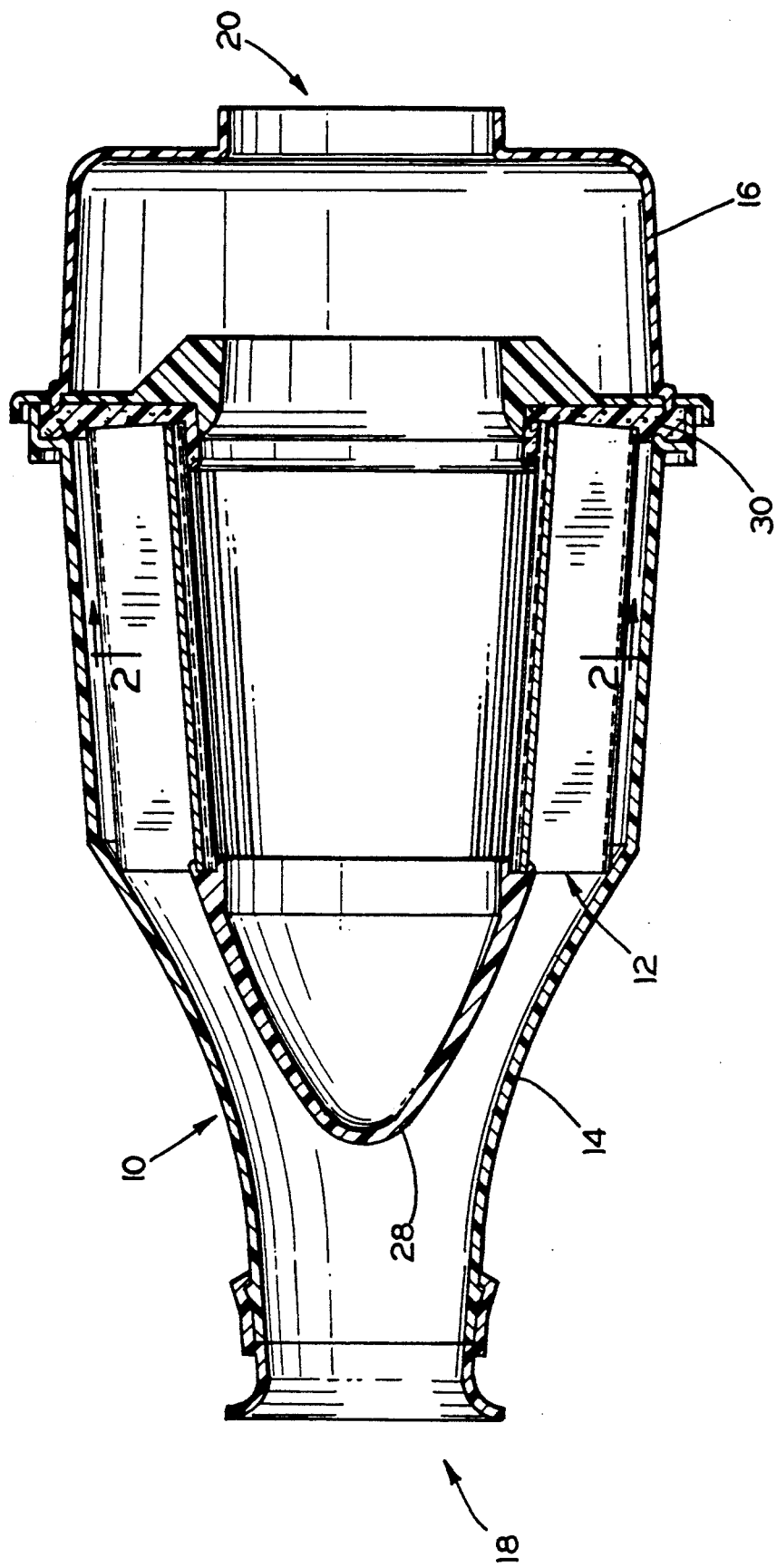
FIG. 1 is a longitudinal sectional view of a high velocity air filter assembly in which the filter element of the present invention may be employed.

Referring now to the drawings, there is illustrated in FIG. 1 a high velocity air filter assembly in accordance with the present invention. As used herein, the term "high velocity air filter" is used to describe any air filter where the flow rate is about 30 feet per minute or greater. The air filter assembly includes a housing designated 10 having a filter element generally designated 12 mounted therein. The housing 10 is formed of a first portion 14 and a second portion 16 which are held together by any appropriate means, such as by conventional clamping means (not shown), so that the filter element 12 is easily replaceable.

The first housing portion 14 is provided with an inlet 18 near the end thereof for receiving unfiltered air. The second housing portion 16 is provided with an outlet 20 to supply filtered air to an engine (not shown). The filter element 12 is interposed between the inlet 18 and outlet 20 of the housing 10 in such a manner that no air can pass out of the outlet 20 without having first passed through the filter element 12.

Figure 2:
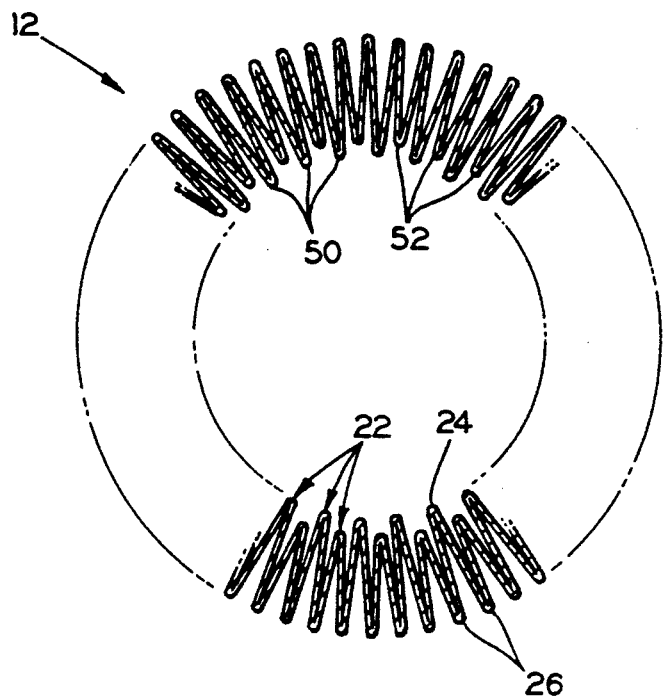
FIG. 2 is a cross-sectional view of the high velocity air filter element shown in FIG. 1 taken along the line 2—2.

The filter element 12 can be generally cylindrically-shaped, but may also be generally frustoconically-shaped as shown in FIG. 1. The filter element 12 is more particularly comprised of a filter media which is typically made of semi-rigid, pleated type filtering material. Paper is one suitable filtering material. The filtering material of the filter element 12 is folded to extend back and forth between radially inner and outer peripheral surfaces to define a series of pleats 22 arranged circumferentially about and extending longitudinally of the filter element 12, as shown in FIG. 2. Each of the pleats 22 has a radially inner, longitudinally extending edge 24 and a pair of radially outer, longitudinally extending edges 26. As will be appreciated, each of the outer edges 26 is shaped by two adjoining pleats 22.

Where the air inlet 18 is positioned at one end of the filter element 12 along the longitudinal axis thereof, as shown in FIG. 1, a cone-shaped deflector 28 is mounted to the end of the filter element 12 proximate the inlet 18.

The deflector 28 seals that end of the filter element 12 and the adjacent ends of the pleats 22, preventing the flow of unfiltered air into the interior of the filter element 12 through the end thereof. The deflector 28 directs the flow of air axially down the exterior of the filter element 12 and between the exterior surfaces of the pleats 22. The air flows through the sides of the filter element 12 to the interior thereof, and then passes through the outlet 20. The deflector 28 is preferably secured to the end of the filter element 12 by means of an adhesive which also seals the ends of the pleats 22.

The opposite end of the filter element 12 is provided with an annular sealing ring 30, typically formed of a urethane, plastisol or similar material, which is preferably molded directly to the end of the filter element 12. The sealing ring 30 may be sealingly engaged between the housing sections 14 and 16 to position the filter element 12 within the housing 10. The sealing ring 30 also secures the downstream ends of the pleats formed in the filter element 12 and prevents the flow of air through the outlet 20 which has not first passed through the filter element 12.

Figure 3:
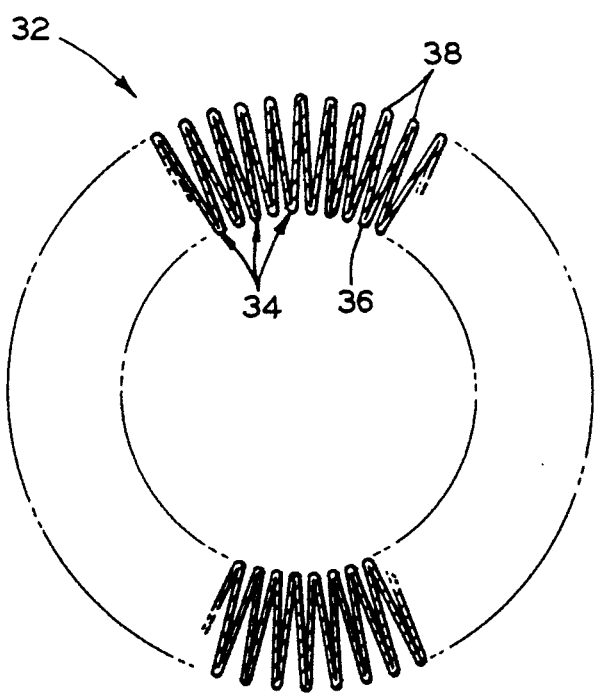
FIG. 3 is a cross-sectional view of a prior art filter element for high velocity air filters.

A typical, prior art filter element 32 for a high velocity air filter is illustrated in cross section in FIG. 3. In the prior art filter element 32, all of the pleats 34 are formed of equal length. That is, the distance between the radially inner peripheral surface defined by the inner edges 36 and the radially outer peripheral surface defined by the outer edges 38 is substantially the same for each pleat 34. More importantly, the distance between the inner edge 36 and the longitudinal axis of the filter element 32 is substantially the same for each pleat 34. Thus, especially in applications where the inner diameter defined by the inner edges 36 of the pleats 34 is relatively small, the inner edges 36 are crowded together, tending to cause an undesirably high restriction to air flow through the filter element 32.

In contrast, the filter element 12 of the present invention is comprised of a series of pleats 22 having alternating long pleats 50 and short pleats 52. The outer edges 24 of all of the pleats 22 are approximately equidistant from the longitudinal axis of the filter element 12. However, the inner edges 26 of the long pleats 50 are a lesser distance from the longitudinal axis of the filter element 12 than are the inner edges 26 of the short pleats 52. This configuration increases the spacing between the inner edges 26 of all of the pleats 22, and it has been found to provide a significantly reduced air flow restriction when compared with a comparably sized filter element 32 employing a conventional air filter pleat configuration.

It has also been determined that, due to the high air velocities encountered in high velocity air filters, it is disadvantageous to form the short pleats 52 too much shorter than the long pleats 50. If the short pleats 52 are too much shorter than the long pleats 50, the short pleats 52 tend to spread and the inner edges of the short pleats pinch off the long pleats 50. This increases the airflow restriction, resulting in a loss of power. It also results in an underutilization of the filtering capacity of the filter media forming the long pleats 50.

Thus, it has been found that the pleats 22 should be formed so that the length of the short pleats is about 75% or more of the length of said long pleats, measured radially from the peripheral surface defined by the inner edges 26 to the peripheral surface defined by the outer edges 24. This assumes that outer edges 24 of all of the pleats 22 extend radially outwardly by approximately the same distance from the longitudinal axis of the filter element 12. With short pleats 52 which are less than about 75% of the length of the long pleats 50, the short pleats 52 tend to pinch off the long pleats 50 in the absence of some independent spacer formation. In a most preferred embodiment, the length of the short pleats 52 is between about 82% and about 92% of the length of the long pleats 50.

In addition, if the short pleats 52 are less than about 75% of the length of the long pleats 50 it becomes difficult to properly seal the upstream end of the filter element 12. The sealing means, such as the deflector 28, must be made of a larger diameter to cover and seal the inner edges 26 of the short pleats 52, as well as the long pleats 50, to effectively seal that end of the filter element 12. If the deflector 28 itself is too large, it could potentially cause an increase in airflow restriction or require a larger filter housing 10.

The following examples are illustrative of the advantages of the staggered short pleat, high velocity air filter element of the present invention. Comparative examples of filter elements having a conventional pleat configuration, wherein all of the pleats were of equal length, are also provided. Each of the filter elements of the examples was generally frustoconically-shaped and was tested in an identical filter housing. In each of the examples, the filter element was tested using an air flow of variable velocity ranging up to about 350 feet per minute.

EXAMPLE 1

The filter element of example 1 was formed from a paper filtering material having a thickness of about 0.030 inches. The filter element was formed with alternating short and long pleats. The long pleats were approximately 1" in length, measured radially from the peripheral surface defined by the inner edges of the long pleats to the peripheral surface defined by the outer edges of the long pleats. The short pleats were approximately ⅞" in length, or approximately ⅛" shorter than the long pleats. The filter element included a total of 77 pleats with a total filter media area of about 5.5 ft². The inner diameter formed by the inner edges of the long pleats went from about 2½" at the inlet end to about 3¼" at the outlet end.

The filter element restriction or pressure drop was determined to be approximately 0.5 inches of water. The overall efficiency of the filter element was approximately 99%, and the capacity was about 80 g, or 14.55 g/ft².

EXAMPLE 2

The filter element of example 2 was formed from the identical filtering material as in Example 1, with alternating short and long pleats. The long pleats were approximately 1" in length, while the short pleats were approximately ⅞" in length. The filter element included a total of 85 pleats with a total filter media area of about 6.1 ft². The inner diameters of the filter element were the same as in Example 1.

The filter element restriction or pressure drop was determined to be approximately 0.5 inches of water. The overall efficiency of the filter element was approximately 99%, and the capacity was about 80 g, or 13.11 g/ft².

COMPARATIVE EXAMPLE A

A conventional high velocity air filter element was formed from the identical paper filtering material as in Examples 1 and 2, with all pleats being of equal length. The filter element included a total of 72 pleats with a total filter media area of about 5.4 ft$^2$. The inner diameters of the filter element were the same as in Examples 1 and 2.

The filter element restriction or pressure drop was determined to be approximately 1.4 inches of water. The overall efficiency of the filter element was approximately 99.7%, and the capacity was about 70 g, or 12.96 g/ft$^2$.

EXAMPLE 3

The filter element of example 3 was formed from a paper filtering material having a thickness of about 0.040 inches. The filter element was formed with alternating short and long pleats. The long pleats were approximately 1" in length, measured radially from the peripheral surface defined by the inner edges of the long pleats to the peripheral surface defined by the outer edges of the long pleats. The short pleats were approximately ⅞" in length, or approximately ⅛" shorter than the long pleats. The filter element included a total of 59 pleats with a total filter media area of about 4.2 ft$^2$. The inner diameters of the filter element were the same as in previous examples.

The filter element restriction or pressure drop was determined to be approximately 1.0 inches of water. The overall efficiency and capacity were not measured for Example 3.

EXAMPLE 4

The filter element of example 4 was formed from the identical paper filtering material as in Example 3, with alternating short and long pleats. The long pleats were approximately 1" in length, measured radially from the peripheral surface defined by the inner edges of the long pleats to the peripheral surface defined by the outer edges of the long pleats. The short pleats were approximately ⅞" in length, or approximately ⅛" shorter than the long pleats. The filter element included a total of 63 pleats with a total filter media area of about 4.5 ft$^2$. The inner diameters of the filter element were the same as in previous examples.

The filter element restriction or pressure drop was determined to be approximately 1.2 inches of water. The overall efficiency and capacity were not measured for example 4.

COMPARATIVE EXAMPLE B

A conventional high velocity air filter element was formed from the identical paper filtering material as in Examples 3 and 4, with all pleats being of equal length. The filter element included a total of 58 pleats with a total filter media area of about 4.35 ft$^2$. The inner diameters of the filter element were the same as in previous examples.

The filter element restriction or pressure drop was determined to be approximately 4.2 inches of water. The overall efficiency and capacity were not measured for Comparative Example B.

Thus, for Examples 1 and 2 and Comparative Example A, it was found that the airflow restriction experienced by the conventional high velocity air filter element was reduced by almost ⅔ using a filter element having alternating short and long pleats in accordance with the present invention. This was the case despite the fact that the filter elements of both examples 1 and 2 were formed with a greater number of pleats and a larger surface area relative to the conventional filter element of the comparative example. In addition, the filter elements of examples 1 and 2 provided a larger filtering capacity per unit area, with only a small decrease in filter efficiency.

The reduction in restriction for Examples 3 and 4 from that in Comparative Example B, a reduction of about ¾, was even more significant. It is believed that the greater reduction in restriction can be attributed to the greater thickness of the paper filtering material used in Examples 3 and 4 and Comparative Example B relative to that used in Examples 1 and 2 and Comparative Example A. The greater the thickness of the filtering material, the more crowded the inner diameter of the filter element becomes, resulting in a greater airflow restriction.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A high velocity air filter comprising a hollow, generally cylindrical filter element formed of a filtering material folded to extend back and forth between radially inner and outer peripheral surfaces to define a series of pleats extending longitudinally of the filter element, each of said pleats having a radially outer, longitudinally extending edge and a radially inner, longitudinally extending edge, the inner edge of a plurality of said pleats being a lesser distance from the longitudinal axis of said filter element than the inner edge of the other of said pleats, to form a plurality of short pleats and a plurality of long pleats, to form a plurality of short pleats is about 75% or more of the length of said long pleats, where the length of each of said pleats is measured radially from the peripheral surface defined by the inner edges to the peripheral surface defined by the outer edges thereof.

2. A high velocity air filter as defined in claim 1, wherein the inner edges of alternating pleats are a lesser distance from the longitudinal axis of said filter element than the inner edges of the pleats therebetween.

3. A high velocity air filter as defined in claim 1, wherein said filter element is frustoconically-shaped.

4. A high velocity air filter as defined in claim 1, wherein the outer edge of each of said pleats extends outwardly by approximately the same distance from the longitudinal axis of said filter element.

5. A high velocity air filter as defined in claim 1, wherein the length of said short pleats is between about 82% and about 92% of the length of said long pleats.

6. A high velocity air filter as defined in claim 1, further comprising sealing means for sealing each end of said filter element.

7. A high velocity air filter as defined in claim 6, further comprising a generally cone shaped deflector mounted on one end of said filter element.

8. A high velocity air filter as defined in claim 1, wherein said filter element is formed of pleated paper.

9. A high velocity air filter as defined in claim 1, wherein the inner diameter defined by the inner edges of said long pleats is about 4" or less.

10. A high velocity air filter comprising a hollow, generally cylindrical filter element formed of a filtering material folded to extend back and forth between radially inner and outer peripheral surfaces to define a series of pleats extending longitudinally of the filter element, each of said pleats having a radially outer, longitudinally extending edge and a radially inner, longitudinally extending edge, the inner edges of alternating pleats being a lesser distance from the longitudinal axis of said filter element than the inner edges of the pleats therebetween to form alternating short pleats and long pleats, wherein the length of said short pleats is about 75% or more of the length of said long pleats, wherein the length of each of said pleats is measured radially from the peripheral surface defined by the inner edges to the peripheral surface defined by the outer edges thereof.

11. A high velocity air filter as defined in claim 10, wherein said filter element is frustoconically-shaped.

12. A high velocity air filter as defined in claim 10, wherein the length of said short pleats is between about 82% and about 92% of the length of said long pleats.

13. A high velocity air filter as defined in claim 10, further comprising sealing means for sealing each end of said filter element.

14. A high velocity air filter as defined in claim 13, further comprising a generally cone shaped deflector mounted on one end of said filter element.

15. A high velocity air filter as defined in claim 10, wherein said filter element is formed of pleated paper.

16. A high velocity air filter comprising a hollow, generally frustoconically-shaped filter element formed of a filtering material folded to extend back and forth between radially inner and outer peripheral surfaces to define a series of pleats extending longitudinally of the filter element, each of said pleats having a radially outer, longitudinally extending edge and a radially inner, longitudinally extending edge, the inner edges of alternating pleats being a lesser distance from the longitudinal axis of said filter element than the inner edges of the pleats therebetween to form alternating short pleats and long pleats, wherein the length of said short pleats is about 75% or more of the length of said long pleats, wherein the length of each of said pleats is measured radially from the peripheral surface defined by the inner edges to the peripheral surface defined by the outer edges thereof.

17. A high velocity air filter assembly, comprising:
a filter housing having an air inlet and an air outlet formed therein; and
a hollow, generally cylindrical filter element mounted within said housing and interposed between the inlet and the outlet of said housing so that air passing from said inlet through said outlet must first pass through said filter element, said filter element comprising a filtering material folded to extend back and forth between radially inner and outer peripheral surfaces to define a series of pleats extending longitudinally of the filter element, each of said pleats having a radially outer, longitudinally extending edge and a radially inner, longitudinally extending edge, the inner edges of alternating pleats being a lesser distance from the longitudinal axis of said filter element than the inner edges of the pleats therebetween to form alternating short pleats and long pleats, wherein the length of said short pleats is about 75% or more of the length of said long pleats, wherein the length of each of said pleats is measured radially from the peripheral surface defined by the inner edges to the peripheral surface defined by the outer edges thereof.

18. A high velocity air filter assembly as defined in claim 17, wherein said filter element is frustoconically-shaped.

19. A high velocity air filter assembly as defined in claim 17, wherein the length of said short pleats is between about 82% and about 92% of the length of said long pleats.

20. A high velocity air filter assembly as defined in claim 17, further comprising a generally cone shaped deflector mounted on the end of said filter element adjacent the inlet of said filter housing.

21. A high velocity air filter assembly as defined in claim 17, wherein said filter element is formed of pleated paper.

* * * * *

UNITED STATES PATENT AND TRADEMARK OFFICE
CERTIFICATE OF CORRECTION

PATENT NO. : 5,320,657
DATED : JUNE 14, 1994
INVENTOR(S) : MICHAEL D. ADAMS

It is certified that error appears in the above-identified patent and that said Letters Patent is hereby corrected as shown below:

Column 6, Claim 1, lines 39 and 40, delete "to form a plurality of short pleats" and insert --wherein the length of said short pleats --.

Signed and Sealed this

Thirteenth Day of September, 1994

*Attest:*

BRUCE LEHMAN

*Attesting Officer*     *Commissioner of Patents and Trademarks*